United States Patent [19]
Levine et al.

[11] Patent Number: 5,778,191
[45] Date of Patent: Jul. 7, 1998

[54] METHOD AND DEVICE FOR ERROR CONTROL OF A MACROBLOCK-BASED VIDEO COMPRESSION TECHNIQUE

[75] Inventors: Stephen N. Levine, Itasca; James C. Brailean, Park Ridge; Mark R. Banham, Arlington Heights, all of Ill.

[73] Assignee: Motorola, Inc., Schaumburg, Ill.

[21] Appl. No.: 548,385

[22] Filed: Oct. 26, 1995

[51] Int. Cl.$^6$ ............................................. H04N 1/415
[52] U.S. Cl. ................................. 395/200.77; 371/48
[58] Field of Search ..................... 364/514 R, 715.02; 348/19, 394, 415, 416, 420; 371/48; 395/114, 185.01, 200.77

[56] References Cited

U.S. PATENT DOCUMENTS

| | | | |
|---|---|---|---|
| 5,493,513 | 2/1996 | Keith et al. | 364/514 R |
| 5,493,514 | 2/1996 | Keith et al. | 364/514 R |
| 5,532,940 | 7/1996 | Agarwal et al. | 364/514 R |
| 5,552,832 | 9/1996 | Astle | 348/420 |

OTHER PUBLICATIONS

Masoud Khansari, Awais Zakauddin, Wai–Yip Chan, Eric Dubois and Paul Mermelstein, Approaces to Layered Coding for Dual–Rate Wireless Video Transmission, IEEE, 1994, pp. 1–5.

Thomas P. O'Rourke, Robert L. Stevenson, Yih–Fang Huang, Lance C. Perez and Daniel J. Costello Jr. "Robust Transmission of Compressed Images over Noisy Gaussain Channels", IRRR 1995 pp. 2319–2322.

M. Khansari, A. Jalali, E. Dubois and P. Mermelstein, "Robust Low Bit–Rate Video Transmission over Wireless Access Systems", IEEE 1994 pp.571–575.

Wai–Man Lam and Amy R. Reibman "An Error Concealment Algorithm for Images Subject to Channel Errors", IEEE 1995 pp. 533–542.

Huifang Sun and Wilson Kwok, David Sarnoff Research Center. "Error Concealment with Directional filtering for Block Transform Coding", IEEE 1993, pp. 1304–1308.

Klaus Illagner and Dirk Lappe "Mobile multimedia communications in a universal telecommunications network", SPIR vlol. 2501 pp. 1034–1043.

Primary Examiner—James P. Trammell
Assistant Examiner—Thomas Peeso
Attorney, Agent, or Firm—Darleen J. Stockley

[57] ABSTRACT

The present invention provides a method (200) and device (300) for error control of a video compressed sequence in which error protection for both random and burst channel errors is provided. The error control syntax (100) applies a fixed length packet synchronization system to variable length coded compressed video data, which provides the capability to limit error propagation within the decoded video bit stream. The fixed length packet control information provides information to decode compressed video data in both forward and reverse directions to allow for the recovery of correctly decoded video data within a decoded frame after long bursts of channel errors while reducing the overhead for error control. The error control method also provides video error detection which may be used for error concealment.

25 Claims, 3 Drawing Sheets

AC=ABSOLUTE COUNT OF NEXT MACROBLOCK IN THE BITSTREAM (7 BITS)
AD=RELATIVE ADDRESS IN BYTES OF MB FROM END OF MV (CEIL(LOG(N/8))
QP=ABSOLUTE QUANTIZATION PARAMETER OF PREVIOUS MACROBLOCK IN THE BITSTREAM (5 BITS)
MV=MOTION VECTOR VALUES OF PREVIOUS MACROBLOCK IN THE BITSTREAM (12 BITS)
MB=POSITION OF START OF NEXT MACROBLOCK IN THE BITSTREAM

METHOD AND DEVICE FOR ERROR CONTROL OF A MACROBLOCK-BASED VIDEO COMPRESSION TECHNIQUE

FIELD OF THE INVENTION

This invention relates generally to video compression transmission, and more specifically to error control for robust transmission of video compressed sequences over error prone channels.

BACKGROUND OF THE INVENTION

The transmission of video compressed bit streams over error prone channels is a difficult problem because the normal compression process, for example, the H.261 and MPEG1 video compression standards, makes the transmitted bitstream more sensitive to bit errors than the video sequence prior to compression. For example, the normal use of entropy encoding within a video compression algorithm results in variable length code (VLC) sequences in which the bitstream contains self synchronization for the coded word boundaries. A single bit error within a variable length coded bit stream typically causes the loss of the coded word boundary synchronization, and therefore the loss of information to the decoder.

Current video compression standards, such H.261 and MPEG1, provide very limited error protection. The typical solution to resynchronization of lost VLCs is to break up a frame into slices (MPEG1) or Groups of Blocks (GOB - H.261/H.263). In both of these cases, resynchronization words, detected by auto-correlation, are placed at the beginning of variable length macroblock sequences which may occur at any point in the bit stream. As such, very long resynchronization words, which can not be produced from the VLC tables, are required. These resynchronization words are, therefore, inefficient from a compression standpoint. In addition, they have very poor auto-correlation properties, and therefore perform poorly under error prone channel conditions. Other methods of error control within these standards include the use of the (511,492) BCH code for H.261. This level of error protection is adequate for the low random bit error rates (BER) found on standard phone lines or ISDN channels, but can not provide sufficient error control over RF channel conditions having high random BER conditions plus error bursts of 20 ms or longer. Such conditions exist in systems such as cellular telephone networks, motivating the need for robust video bitstreams for transmission of video information in those environments.

DETAILED DESCRIPTION PREFERRED EMBODIMENT

The present invention provides a reliable error control method for the transmission of video compressed bit streams over an error prone channel. The method is designed to provide error control for video compression schemes which use a motion compensated prediction, macroblock-based approach, and is characterized by the following capabilities:

1. Provides both random and burst error protection.
2. Provides frame loss protection.
3. Limits loss of VLC synchronization, which requires that error propagation beyond a channel error burst be curtailed.
4. Provides video error detection so as to allow error concealment techniques to be applied.
5. Accomplishes the above goals in a very efficient manner, so as to reduce the required error control overhead.

This method provides a synchronous (fixed length) format for transmitting packets of video data. This reduces the packet synchronization requirement to a frame synchronization problem. As such, packet boundaries and associated control information can be located relative to frame sync words, and a packet requires no additional synchronization overhead. In the present invention, the use of embedded synchronization words to provide VLC synchronization is avoided. This is because fairly long sync words would be necessary to reduce the probability of false detection of sync words. Such words would require a minimum distance from all medium to long VLC code words, and also have to satisfy certain autocorrelation criteria. The GOB and slice synchronization words of the H.261 and MPEG1 standards do not fulfill these criteria, and are also very inefficient.

Figure 1:
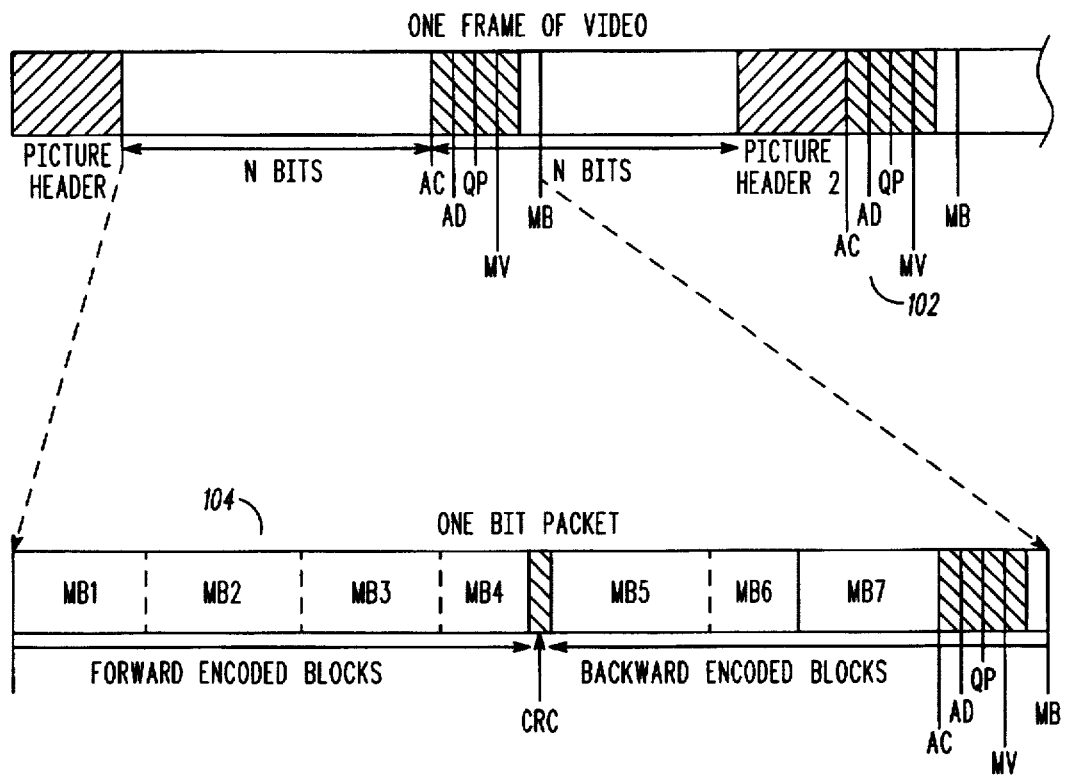
FIG. 1 is a diagrammatic representation of the bitstream syntax required for error control in accordance with the present invention.

A diagrammatic representation of an error robust bitstream syntax in accordance with the present invention is shown in FIG. 1, numeral 100. In (102) more than two N bit packets of video information from one frame of video are shown. Picture (frame) header information, which contains information required for decoding the frame plus a frame synchronization word, or picture start code, is transmitted twice per frame, separated by N bits, where N is a predetermined positive integer, to provide frame loss protection. If the first picture header is lost, then the second header provides critical frame information. The two Picture Headers are distinguished by a single bit ID at the end of the picture start code. The number of bits in a packet, N, is determined according to a desired trade-off between error control overhead and error detection properties. Two representative values for N at target video transmission rates of 24 kilobits/sec and 48 kilobits/sec are N=512, and N=768, respectively.

At the beginning of each packet is packet control information, which consists of four control words: Absolute Count (AC), Relative Address (AD), Absolute Quantization Parameter (QP), and Absolute Motion Vector (MV). The location of this information is fixed relative to the Picture Header. Therefore, after frame synchronization is achieved, the location of all of the packet control information within the frame is known.

Utilization of a fixed length packet for variable length video macroblocks results in a variable number of video macroblocks within a packet. As a result, the last macroblock of one packet may overflow into the next packet. The relative address (AD) in bytes from the end of the control words at the end of the current packet to the start of the first complete macroblock is provided in the packet control information. Since the relative address is rounded off to byte resolution, there will be an average of 4 bits left over within a packet as byte roundoff. These bits are used in a variable length error detection code word, CRC, seen in the middle of one bit packet in (104). More information regarding the use of this code word is provided later.

In order to halt the propagation of VLC synchronization loss, all information required to resynchronize the decoder must be provided at the start of each packet. As such, all information which is differentially encoded must be coded with an absolute value and provided at packet boundaries. This method provides control information for macroblocks which have a certain quantization associated with them, for example, the quantization of Discrete Cosine Transform (DCT) coefficients in a transform of the macroblock. The absolute value of the differentially coded quantization parameter for the last macroblock in the previous packet is coded as QP. If the previous packet is lost, the quantization value for the first MB of the current packet is equal to QP plus the differential quantization parameter for this first MB. Assignment of the QP in this manner also provides an efficient mechanism for allowing reverse decoding to occur, as explained below. In addition, the absolute (non-predicted) value of the Motion Vectors are coded at packet boundaries (MV). Differential MVs are also encoded in the normal fashion within the macroblock data so that the backward reading of data described below may be accomplished. Finally, the count of the first macroblock (AC) starting at the relative address (AD) location of the packet is provided. This allows for the appropriate relocation of the recovered macroblocks within the decoded frame.

The lower bitstream within FIG. 1, (104), shows the bitstream syntax of a single packet. In this figure, a representative group of macroblocks are shown for demonstration purposes. These macroblocks are numbered 1 though 7. As shown on the right side, macroblock 7 (MB7) is split between the end of the current packet and the start of the next. Another aspect of the syntax is that the macroblocks within a packet are divided in half and bit encoded in the forward direction for the front half of the packet and backward encoded (each macroblock is bit reversed) in the second half of the packet. This further limits the loss of VLC synchronization period by providing two states within a packet in which decoding can be initiated. That is, instead of using the packet control information to reinitialize the decoder after lost VLC synchronization just once per packet in the forward direction, the above syntax uses each packet control point twice (resetting the decoding process twice per packet control word), by initiating decoding in both the forward and reverse directions from the packet control information. If a channel error causes loss of VLC synchronization, say in MB3, then MB1 and MB2 will be recovered and the rest of the frame will be temporarily lost. However, after reinitializing the decoder at the end of the packet, MB5–MB7 may be recovered by decoding in reverse bit order from the known state at the packet boundary. If only conventional forward encoding of each macroblock were used, then MB3–MB7 would all be lost.

Loss of VLC synchronization can be reliably ascertained by detection of an improper variable length decoded word (VLD) at the decoder, or the detection of a parameter out of range. Detection of out of range packet control information is also used. In addition, at the end of the macroblock coding at the center of the packet, a check is made if both the forward and backward encoded streams meet correctly. To further improve packet error detection, a cyclic redundancy check (CRC) code word is placed at the center of the packet. The CRC word uses the remaining bits after rounding the starting address of the first macroblock to a byte resolution, and is variable in length. The Hamming (511, 502) BCH code is used for error detection. The CRC word (b0–b8) is truncated to the number of bits available within the N bit packet after rounding to the nearest byte of the location of the first macroblock designated by address value AD.

The convention for choosing the middle point for the forward/backward coding approach is based on the absolute count of the first macroblock in the N bit packet (MB_A), and the absolute count of the last macroblock in the packet (MB_B). In this approach, the middle macroblock number (MB_MID) (which is the last macroblock in the packet coded in the forward direction) is given by:

$$MB\_MID = MB\_A + \frac{(MB\_B - MB\_A)}{2},$$

where the division is assumed to be integer division. An example of control information parameter values based upon FIG. 1, numeral 100, is:
AC-first packet=1
AC-second packet=8
MB_MID=1+(7−1)/2=4
AD=5 bytes For an MB7 carry over into the next packet of 36 bits, then the extra bits available for the CRC word are 5×8−36=4 bits.

The overhead of the above error control is 24+CEIL(log (N/8) bits for the packet control information and an average of 4 bits for CRC per N bit packet. The function CEIL(log (N/8)) is the number of bits needed to represent a relative address in bytes, having a maximum of N bits and rounded up to the nearest integer. This figure is 6 for N=512, for example, leading to an overhead of 30 bits for error control words. A representative example of 38 bits is typically used for the second picture start code and header information (initial quantization parameters, temporal references, and picture type information), sent with Picture Header 2 at bit 2N. At 24 kilobits/sec, and N=512, for a frame rate of 11 frames/second (fps), which is typical for a moderate motion sequence at this bit rate, this is approximately 1914 bits/sec or a 7.9% overhead. For comparison, the H.263 standard uses a variable length GOB structure with a 17 bit Group of Block Start Code, plus 14 bits of other overhead for macroblock addressing and quantization. The H.263 GOB layer overhead at 11 fps is 3069 bits/sec or 12.8%. This is 1.6 times the overhead of the present invention, and does not include any CRC protection. In addition, the control information provided by H.263 does not offer the same potential resynchronization capabilities provided by the present method which includes backward decoding and two picture headers per frame.

Figure 2:
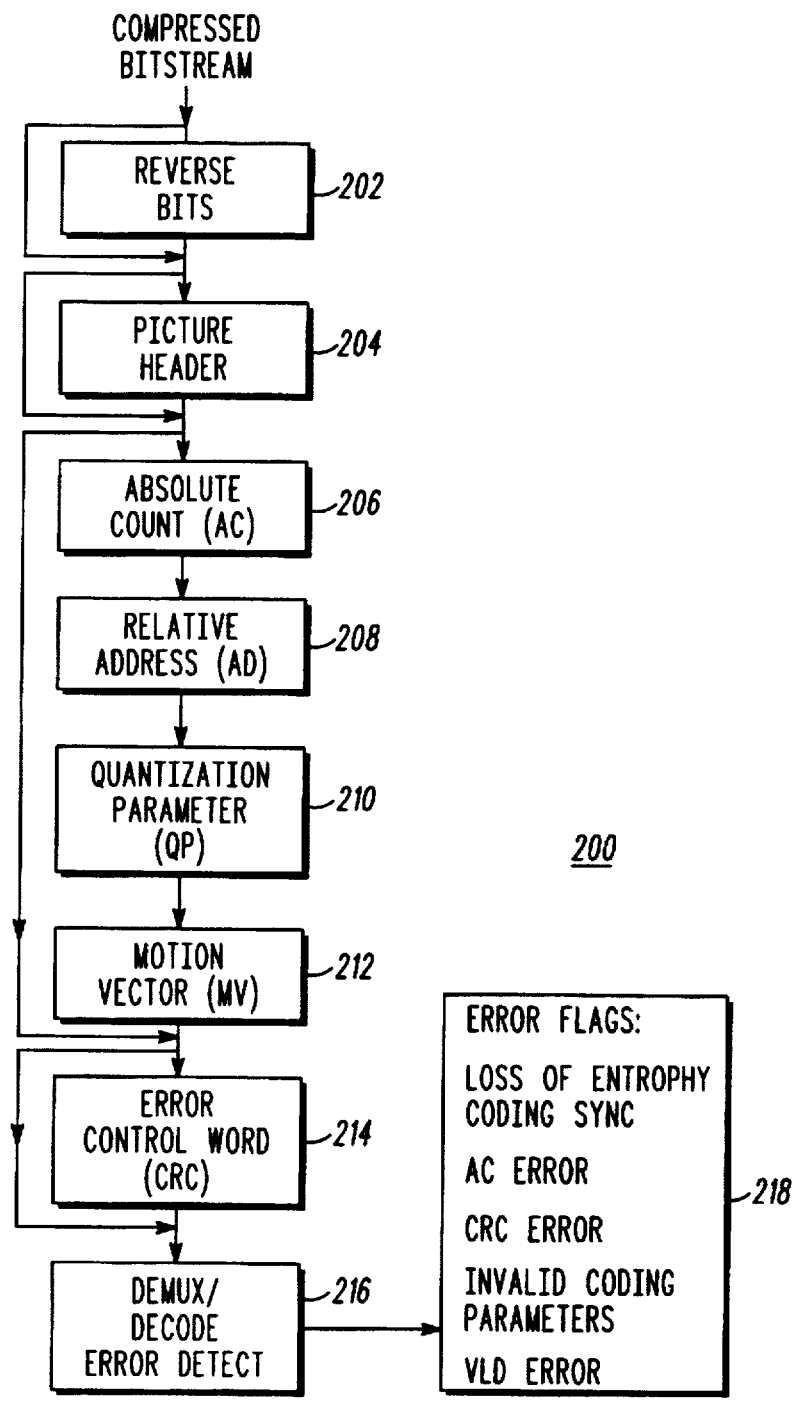
FIG. 2 is a flow chart of a preferred embodiment of steps of a method in accordance with the present invention.

FIG. 2, numeral 200, is a flow diagram of one preferred embodiment of a method in accordance with the present invention. This figure shows a chronological placement of control words in the compressed bitstream. Each of these control words is either placed in the output bitstream in accordance with the diagram, or bypassed as shown. The placement of these control words is controlled by a multiplexing scheme described in more particularity above. The components of this error control method include techniques or control words in the encoder consisting of: a bit reversal applied to bits from macroblocks in the second half of a bit packet in accordance with the present method (202); a picture header consisting of a first picture start code or a second picture start code and appropriate frame header information (204); an absolute count of the first macroblock of the next bit packet in the compressed bitstream (206); a relative address in bytes from the end of the control words at the end of the current packet to the start of the next complete macroblock in the bitstream (208); an absolute quantization parameter value of the last macroblock in the present bit packet (210); an absolute motion vector value of the last macroblock in the present packet (212); and, an error control check word, such as a CRC code word, for detecting errors in the present packet (214). In the decoder, a demultiplex operation is applied along with decoding of the compressed bitstream, which has been encoded in both the forward and backward directions, as described in more particularity above, followed by an error detection operation (216). The result of the error control information provided to the decoder is the detection of errors which may be categorized according to (218): loss of entropy coding synchronization; erroneous AC code word; CRC error; invalid coding parameters; and variable length decoder (VLD) error. These error flags may be passed to an appropriate error concealment scheme to permit recovery of the video data before display in the decoder.

Figure 3:
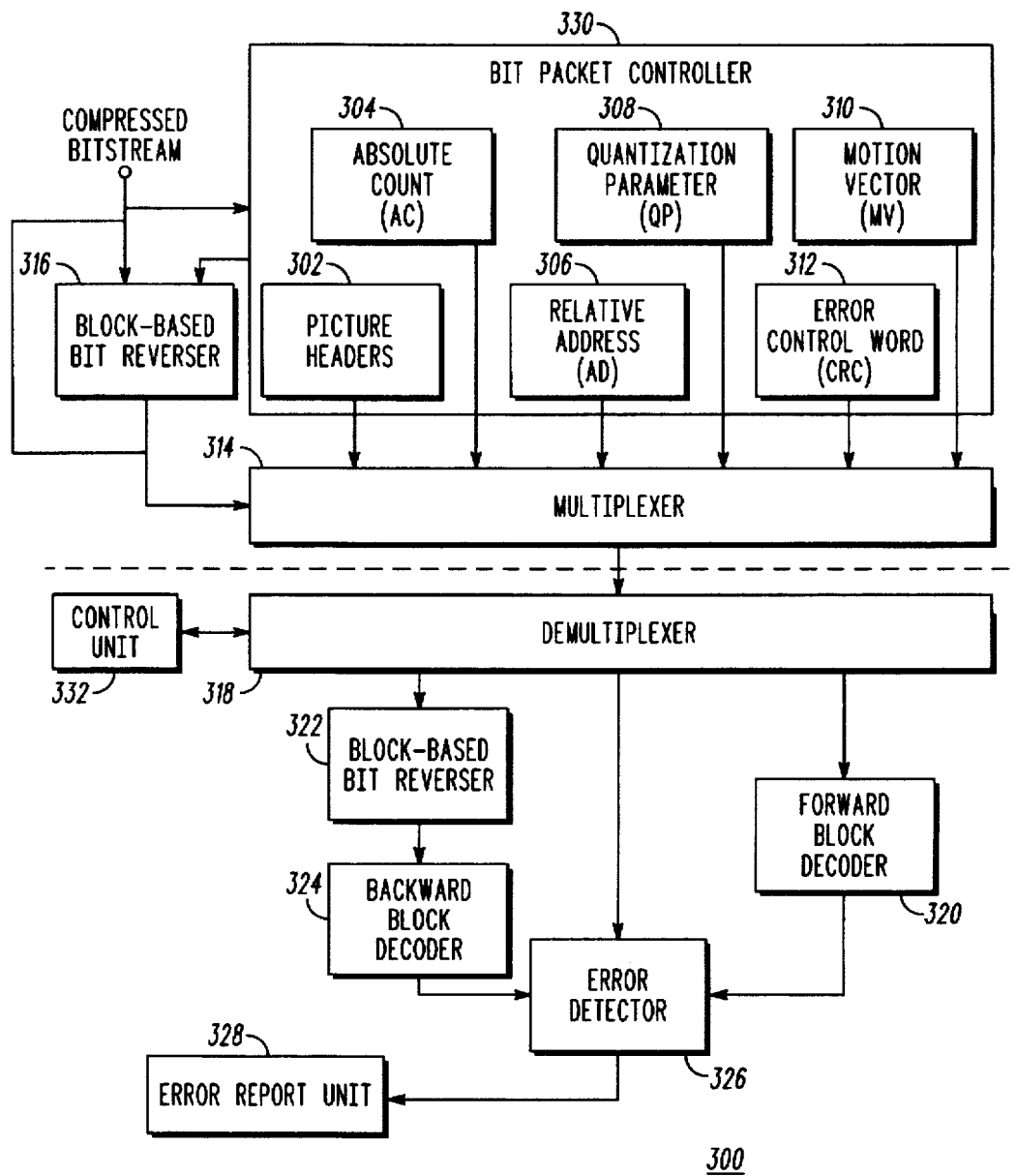
FIG. 3 is a block diagram of one preferred embodiment of a device in accordance with the present invention.

FIG. 3, numeral 300, is a block diagram of one preferred embodiment of a device in accordance with the present invention. In the encoder, the error control information utilized by this device is computed by a bit packet controller (330) coupled to the compressed bitstream, a block-based bit reverser (316), and a multiplexer (314). The error control information is provided to the multiplexer (314) through inputs from the bit packet controller which generates the following control words: picture headers (302); absolute count, AC, of next macroblock in the bitstream (304); relative address, AD, of the next macroblock in the bitstream in bytes (306); absolute quantization parameter value, QP, of the last macroblock in a present packet of bits (308), absolute motion vector, MV, associated with the last macroblock in the present packet of bits (310); and a check word, CRC, providing error detection capabilities for the present packet of bits (312). The multiplexer (314) is coupled to input from the compressed bitstream, the bit packet controller (330), and the output of a block-based bit reversal unit (316) which is also coupled to the compressed bitstream and bit packet controller for reversing the order of macroblocks which are designated as backwards encoded macroblocks. In the decoder, a demultiplexer (318) removes the appropriate bits and passes them to another block-based bit reversal unit (322), as directed by a control unit (332), and subsequently to a decoder unit (324), or directly to a decoder unit (320). Error detection is performed by an error detector (326) which is coupled to input from the demultiplexer (318), and both forward and backward block decoders, (320) and (324). The error detector (326) utilizes the control information, and the decoded bitstreams to signal the presence of specific errors. These errors are subsequently reported by an error report unit (328), and include: loss of entropy coding synchronization, errors in the AC due to a decreasing count, CRC errors, any other invalid coding parameters detected, and variable length decoder (VLD) errors. This information may subsequently be passed onto other devices for the purpose of error concealment.

The method and device may be selected to be embodied in least one of: A) an application specific integrated circuit; B) a field programmable gate array; and C) a microprocessor; and D) a computer-readable memory; arranged and configured to determine the first modified received signal having minimized distortion and interference in accordance with the scheme described in greater detail above.

Although exemplary embodiments are described above, it will be obvious to those skilled in the art that many alterations and modifications may be made without departing from the invention. Accordingly, it is intended that all such alterations and modifications be included within the spirit and scope of the invention as defined in the appended claims.

We claim:

1. A method of error control of a macroblock-based video codec, wherein macroblocks are encoded using entropy coding, comprising:

A) utilizing, in a decoder, control information and a plurality of picture headers in fixed positions relative to a beginning of a frame wherein the control information provides decoding information for decoding at least a forward sequence of macroblocks;

B) detecting errors in the frame and limiting propagation of errors in the frame utilizing the control information and the plurality of picture headers, wherein the control information defines a boundary of individual packets and includes:

C) an absolute count of a next/previous macroblock within the frame;

D) a relative address of a start of a next macroblock in a next packet; and

E) absolute values for predetermined differentially encoded information, where the relative address is quantized to bytes, and where a quantization remainder determines a number of bits available for an error detection code.

2. The method of claim 1 wherein the predetermined differentially encoded information includes at least one of:

A) a quantization parameter of an immediately previous macroblock; and

B) a motion vector value of the immediately previous macroblock.

3. The method of claim 1 wherein detecting an error in the frame includes detecting an error in the packet wherein at least one of:

A) detecting loss of entropy coding synchronization;

B) determining whether the absolute count is decreasing;

C) detecting an incorrect error detection code; and

D) determining whether invalid coding parameters are present.

4. The method of claim 1 wherein at least one of the picture headers is utilized to determine a start of the frame.

5. The method of claim 1 wherein the method is a process whose steps are embodied in least one of:

A) an application specific integrated circuit;

B) a field programmable gate array; and

C) a microprocessor; and

D) a computer-readable memory; arranged and configured to determine the first modified received signal having minimized distortion and interference in accordance with the scheme of claim 1.

6. The method of claim 1 wherein the control information defines a boundary of individual packets and includes:

A) an absolute count of a next/previous macroblock within the frame;

B) a resynchronization start code inserted at the first bit of a next macroblock within the frame; and C) absolute values for predetermined differentially encoded information.

7. The method of claim 6 wherein the predetermined differentially encoded information includes at least one of:

A) a quantization parameter of an immediately previous macroblock; and

B) a motion vector value of the immediately previous macroblock.

8. The method of claim 6 wherein detecting an error in the frame includes detecting an error in the packet wherein at least one of:

A) detecting loss of entropy coding synchronization;

B) determining whether the absolute count is decreasing;

C) detecting an incorrect error detection code; and

D) determining whether invalid coding parameters are present.

9. The method of claim 6 further including that encoding of the macroblocks includes outputting the macroblocks in a forward bit order for a predetermined number of macroblocks and in a bit-reversed bit order for a second predetermined number of macroblocks and wherein a control information is used to decode both forward and reverse bit encoded macroblocks.

10. The method of claim 9 wherein an error detection code is inserted between the forward and bit-reversed maroblocks.

11. A method of error control of a macroblock-based video codec, wherein macroblocks are encoded using entropy coding, comprising:

A) utilizing, in a decoder, control information and a plurality of picture headers in fixed positions relative to a beginning of a frame wherein the control information provides decoding information for decoding at least a forward sequence of macroblocks;

B) detecting errors in the frame and limiting propagation of errors in the frame utilizing the control information and the plurality of picture headers, wherein the control information defines a boundary of individual packets and includes:

C) an absolute count of a next/previous macroblock within the frame;

D) a relative address of a start of a next macroblock in a next packet; and

E) absolute values for predetermined differentially encoded information, further including that encoding of the macroblocks includes outputting the macroblocks in a forward bit order for a predetermined number of macroblocks and in a bit-reversed bit order for a second predetermined number of macroblocks and wherein a control information is used to decode both forward and reverse bit encoded macroblocks.

12. The method of claim 11 wherein an error detection code is inserted between the forward and bit-reversed marcroblocks.

13. The method of claim 2 wherein the relative address is quantized to bytes, and where a quantization remainder determines a numbers of bits available for an error detection code.

14. The method of claim 11 wherein at least one of the picture headers is utilized to determine a start of the frame.

15. The method of claim 11 wherein the method is a process whose steps are embodied in least one of:

A) an application specific integrated circuit;

B) a field programmable gate array; and

C) a microprocessor; and

D) a computer-readable memory;

arranged and configured to determine the first modified received signal having minimized distortion and interference in accordance with the scheme of claim 1.

16. A device for error control and concealment of a macroblock-based video codec, wherein macroblocks are encoded using entropy coding, wherein the device is directed by a computer program that is embodied in at least one of:

A) a memory;

B) an application specific integrated circuit;

C) digital signal processor; and

D) a field programmable gate array, and the computer program includes steps of:

E) utilizing control information and a plurality of picture headers in fixed positions relative to a beginning of a frame wherein the control information provides decoding information for decoding at least a forward sequence of macroblocks;

F) detecting errors in the frame and limiting propagation of errors in the frame utilizing the control information and the plurality of picture headers, wherein the control information computed by a bit packer controller defines a boundary of individual packets and includes:

G) an absolute count of a next/previous macroblock within the frame;

H) a relative address of a start of a next macroblock in a next packet; and

I) absolute values for predetermined differentially encoded information, where the relative address is quantized to bytes, and where a quantization remainder determines a number of bits available for an error detection code.

17. The device of claim 16 wherein the predetermined differentially encoded information includes at least one of:

A) a quantization parameter of an immediately previous macroblock; and

B) a motion vector value of the immediately previous macroblock.

18. The device of claim 16 wherein the an error detection unit performs detecting of an error in a packet wherein at least one of:

A) detecting loss of entropy coding synchronization;

B) determining whether the absolute count is decreasing;

C) detecting an incorrect error detection code; and

D) determining whether invalid coding parameters are present.

19. The device of claim 16 further including two block-based bit reversers utilized such that encoding of the macroblocks includes outputting the macroblocks in a forward bit order for a predetermined number of macroblocks and in a bit-reversed bit order for a second predetermined number of macroblocks and wherein a control information is used to decode both forward and reverse bit encoded macroblocks.

20. The device of claim 19 wherein an error detection code is inserted between the forward and bit-reversed maroblocks.

21. The device of claim 20 wherein the relative address is quantized to bytes, and where a quantization remainder determines a number of bits available for an error dection code.

22. The device of claim 16 wherein at least one of the picture headers is utilized to determine a start of the frame.

23. A device for error control and concealment for packets in a compressed bitstream in a macroblock-based video codec, wherein macroblocks are encoded using entropy coding, and a fixed length packet synchronization system is applied to variable length coded compressed video data, to limit error propagation within a decoded video bitstream, wherein the device comprises at least one of an encoder and a decoder, wherein the encoder comprises:

A) a bit packet controller, coupled to receive a compressed bitstream, for computing error control information by generating a plurality of predetermined control words, wherein packet control information is placed at a beginning of each packet;

B) a block-based bit reverser, coupled to receive the compressed bitstream and to the bit packet controller, for reversing a macroblock bit order for macroblocks that are designated as backwards encoded macroblocks; and C) a multiplexer, coupled to the bit packet controller, the compressed bitstream and to the block-reversed bit reverser, for multiplexing the error control information and the compressed bitstream with the output of the block-based bit reverser according to a predetermined scheme;

and in the decoder comprises:

D) a demultiplexer, coupled to receive a multiplexed bitstream and to a control unit, for removing bits indicated by the control unit in accordance with a predetermined scheme and sending the bits to a second block-based bit reversal unit, a forward block decoder, and an error detector;

E) the second block-based bit reversal unit, coupled to the demultiplexer, for reversing a macroblock bit order for macroblocks in accordance with the predetermined scheme to provide an output; and F) a backward block decoder, coupled to the second block-based bit reversal unit, for decoding the output of the second block-based bit reversal unit;

G) a forward block decoder, coupled to the demultiplexer, for decoding the bits from the demultiplexer;

H) an error detector, coupled to the demultiplexer, the backward block decoder, and to the forward block decoder, for utilizing control information and the decoded bitstreams to signal a presence of specific errors.

24. The device of claim 23 further including an error report unit, coupled to the error detector, for outputting an error report, for utilization in error concealment, wherein the error report including at least one of: loss of entropy coding synchronization, errors in an absolute count due to a decreasing count, cyclic redundancy count errors, other coding parameters detected that have been preselected to indicate invalidity, and variable length decoder errors.

25. The device of claim 23, wherein the bit packet controller generates at least the following control words: picture headers; absolute count, AC, of next macroblock in the bistream; relative address, AD, of the next macroblock in the bitstream in bytes; absolute quantization parameter value, QP, of the last macroblock in a present packet of bits, absolute motion vector, MV, associated with the last macroblock in the present packet of bits; and a check word, CRC, providing error detection capabilities for the present packet of bits.

* * * * *